US006915237B2

(12) United States Patent
Hashemian

(10) Patent No.: US 6,915,237 B2
(45) Date of Patent: Jul. 5, 2005

(54) INTEGRATED SYSTEM FOR VERIFYING THE PERFORMANCE AND HEALTH OF INSTRUMENTS AND PROCESSES

(75) Inventor: Hashem M. Hashemian, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 39 days.

(21) Appl. No.: 10/438,356

(22) Filed: May 14, 2003

(65) Prior Publication Data

US 2003/0216879 A1 Nov. 20, 2003

Related U.S. Application Data

(60) Provisional application No. 60/380,516, filed on May 14, 2002.

(51) Int. Cl.$^7$ .............................................. G06F 19/00
(52) U.S. Cl. ...................................... 702/183; 700/108
(58) Field of Search ............................ 702/183, 57–59, 702/118, 121, 182, 185, 199, 188; 700/9, 21, 29, 49, 108, 110, 174

(56) References Cited

U.S. PATENT DOCUMENTS

| 4,184,205 A | * | 1/1980 | Morrow ........................ 702/34 |
| 4,295,128 A | | 10/1981 | Hashemian et al. |
| 5,616,824 A | * | 4/1997 | Abdel-Malek et al. ........ 73/1.01 |
| 5,764,509 A | | 6/1998 | Gross et al. |
| 6,633,782 B1 | * | 10/2003 | Schleiss et al. ................ 700/26 |

OTHER PUBLICATIONS

Hashemian et al., "Long Term Performance and Aging Characteristics of Nuclear Plant Pressure Transmitters," U.S. Nuclear Regulatory Commission, NUREG/CR–5851, Mar. 1993.

"On–Line Monitoring of Instrument Channel Performance," EPRI Technical Report TR 104965–R1 NRC SER, Sep. 2000.

Hashemian et al., "Management of Ageing of I&C Equipment in Nuclear Power Plants," IAEA Publication TEC-DOC–1147, Vienna, Austria, Jun. 2000.

Hashemian et al., "Advanced Instrumentation and Maintenance Technologies for Nuclear Power Plants," U.S. Nuclear Regulatory Commission, NUREG/CR–5501, Aug. 1998.

Hashemian et al., "Aging of Nuclear Plant Resistance Temperature Detectors," U.S. Nuclear Regulatory Commission, NUREG/CR–5560, Jun. 1990.

Hashemian, "On–Line Testing of Calibration of Process Instrumentation Channels in Nuclear Power Plants," U.S. Nuclear Regulatory Commission, NUREG/CR–6343, Nov. 1995.

Hashemian et al., "Effect of Aging on Response Time of Nuclear Plant Pressure Sensors," U.S. Nuclear Regulatory Commission, NUREG/CR–5383, Jun. 1989.

Hashemian et al., "Validation of Smart Sensor Technologies for Instrument Calibration Reduction in Nuclear Power Plants," U.S. Nuclear Regulatory Commission, NUREG/CR–5903, Jan. 1993.

Hashemian, "New Technology for Remote Testing of Response Time of Installed Thermocouples," U.S. Air Force, Arnold Engineering Development Center, AEDC–TR–91–26, vol. 1—Thermocouple Response Time Test Instrumentation, Jan. 1992.

(Continued)

*Primary Examiner*—Edward Raymond
(74) *Attorney, Agent, or Firm*—Pitts & Brittian, P.C.

(57) ABSTRACT

A system and method for verifying the performance and health of instruments and processes. A computer runs software that collects data from sampled sensors, stores the data, screens the data for outliers, analyzes the data, performs in situ testing, and generates results of the analysis and testing. The system and method verifies not only the steady state performance of instruments, but also the dynamic performance of instruments and the transient behavior of the processes.

32 Claims, 9 Drawing Sheets

OTHER PUBLICATIONS

Hashemian, "Advanced Sensor and New I&C Maintenance Technolgies for Nuclear Power Plants," Jun. 1999.

Hashemian, "Review of Advanced Instrumentation and Maintenance Technolgies for Nuclear Power Plants," presented at the 43rd Annual ISA POWID Conference 2000, San Antonio, TX Jun. 4–9, 2000.

Hashemian, "Increasing Instrument Calibration Intervals," presented at the 44th Annual ISA POWID Conference 2001, Orlando, FL, Jul. 07–13, 2001.

Hashemian, "Optimized Maintenance and Management of Ageing of Critical Equipment in Support of Plant Life Extension," presented at the 2000 ANS/ENS International Meeting, Washing, DC, Nov. 12–16, 2000.

"Hines Research Summaries," http://web.utk.edu/~hines/research.html.

Hashemian, "Power Uprating in PWR Plants By Better Measurement of Reactor Coolant Flow," presented at the 2000 ANS/ENS International Meeting, Washington, DC, Nov. 12–16, 2000.

Bond et al., "Integration of Monitoring and Diagnostics into Nuclear Plant Instrumentation and Control Upgrades," Westinghouse Electric Corporation, PLEX '93 Conference—Zurich, Switzerland, Nov. 12–Dec. 1, 1993.

May, "Portable Work Station for Calibration of Instruments in Nuclear Power Plants," Levy Systems, EPRI Workshop, Mar. 10, 1987.

Redundant Instrument Monitoring System (RIMS System), CANUS Corporation, Laguna Hills, CA.

Meyer, "Data Analysis & Findings," Calibration Reduction Meeting, CT, 1989.

Gross et al., "Sequential Probability Ratio Test for Nuclear Plant Component Surveillance," Argonne National Laboratory, Nuclear Technology, vol. 93, Feb. 1991.

Mott et al., "Pattern–Recognition Software for Plant Surveillance," El International, Inc., and King, Argonne National Laboratory.

Rusaw, "Instrumentation Calibration and Monitoring Program (ICMP at V.C. Summer Nuclear Station," Oct. 6, 1994.

Hughes, "Instrumentation Calibration and Monitoring Program—Calculation Methodology at South Texas Project".

"Use of As–Found/As–Left Calibration Data," SP67.04 Committee Item 7 Technical Report, Jun. 4, 1993.

Gross et al., "ICMP Surveillance Systems from Argonne National Laboratory".

Wooten, "Instrument Calibration and Monitoring Program," a presentation to the Nuclear Regulatory Commission, Oct. 13, 1994.

Holbert et al., "Empirical Process Modeling Technique for Signal Validation," Ann. Nucl. Energy, vol. 21, pp 387–403, 1994.

Upadhyaya et al., "Application of Neutral Networks for Sensor Validation and Plant Monitoring," University of TN, Nuclear Technology, vol. 97, Feb. 1992.

Holbert et al., "Redundant Sensor Validation by Using Fuzzy Logic," Nuclear Science and Engineering 118, pp 54–64, May 1994.

Uhrig, "Potential Use of Neutral Networks in Nuclear Power Plants," Univ. of TN, Proceedings of the 8th Power Plant Dynamics Control & Testing Symposium, Knoxville, TN, May 27–29, 1992.

Sackett, "Application of A1 Technology to Nuclear Plant Operations," Argonne National Laboratory, ASEE Annual Conference, Portland, OR, Jun. 19–24, 1988.

Holbert et al., "Development and Testing of an Integrated Signal Validation System for Nuclear Power Plants," The Univ. of TN, DOE/NE/37959–36, Oct. 1989.

Stansberry et al., "Manual for AMS Calibration Reduction System Prototype," Analysis and Measurement Services Corp., prepared for Duke Power Company, CRS9201R1, Feb. 1992.

James, Calibration Through On–Line Performance Monitoring of Instrument Channels, Electric Power Research Institute, TR–104965 Draft, Aug. 1995.

"An Evaluation of the Use of Signal Validation Techniques as a Defense Against Common–Cause Failures," Los Alamos Technical Associates, EPRI NP–5081, Feb. 1987.

Davis et al., "Calibration Reduction and the Instrument Performance Assessment Software System," EPRI I&C Workshop, St. Petersburg, FL, Dec. 11, 1997.

Dorr et al., "Detection, Isolation and Identification of Sensor Faults in Nuclear Power Plants," IEEE Transactions on Control Systems Technology, vol. 5, No. 1, Jan. 1997.

"Regulatory Guide 1.105—Instrument Setpoints," U.S. Nuclear Regulatory Commission, Nov. 1976.

"Regulatory Guide 1.160—Monitoring the Effectiveness of Maintenance at Nuclear Power Plants," U.S. Nuclear Regulatory Commission, Jun. 1993.

"Instrument Calibration and Monitoring Program, vol. 1: Basis for the Method," Science Applications International Corp., EPRI–TR–103436–V1, Dec. 1993.

"Instrument Calibration and Monitoring Program, vol. 2: Failure Modes and Effects Analysis," Science Applications International Corp., EPRI–TR–103436–V2, Dec. 1993.

Thie, "Surveillance of Instrumentation Channels at Nuclear Power Plants," EPRI NP–6067, Oct. 1988.

Thie, "Utility Requirements for Human–Centered Automation in Surveillance Testing," EPRI TR–100814, Aug. 1992.

Frogner et al., "Signal Validation by Combining Model–Based and Evidential Reasoning Approaches," Expert–EASE Systems, ISA Proceedings, 1988.

Upadhyaya, "Sensor Failure Detection and Estimation," Univ. of TN, Nuclear Safety, vol. 26, No. 1, Jan.–Feb./1985.

"SureSense Online Signal Validation Software," http://aiaa.knowledgesharing.com/scripts/nls_ax.dll/w3SuccItem(2202414), http://www.expmicrosys.com/.

"Dynamic Sensor Data Validation for Reusable Launch Vehicle Propulsion," http://www.techtransfer.anl.gov/highlights/8–3/transportation.html.

Holbert et al., "Instrument Calibration Reduction Using Signal Validation," Transactions of the American Nuclear Society, vol. 69, pp. 372–373, 1993.

"On–Line Monitoring," EPRI, Dec. 2002, http://www.epri.com/OrderableitemDesc.asp?product_id=1007553.

"DOE—EPRI On–Line Monitoring Implementation Guidelines," EPRI, Jan. 2003, http://www.epri.com/OrderableitemDesc.asp?product_id=000000000001007622&targetnid=262206&valu. . . .

"Computer Codes; MSET," Argonne National Laboratory, http://www.rae.ani.gov/codes/mset/.

* cited by examiner

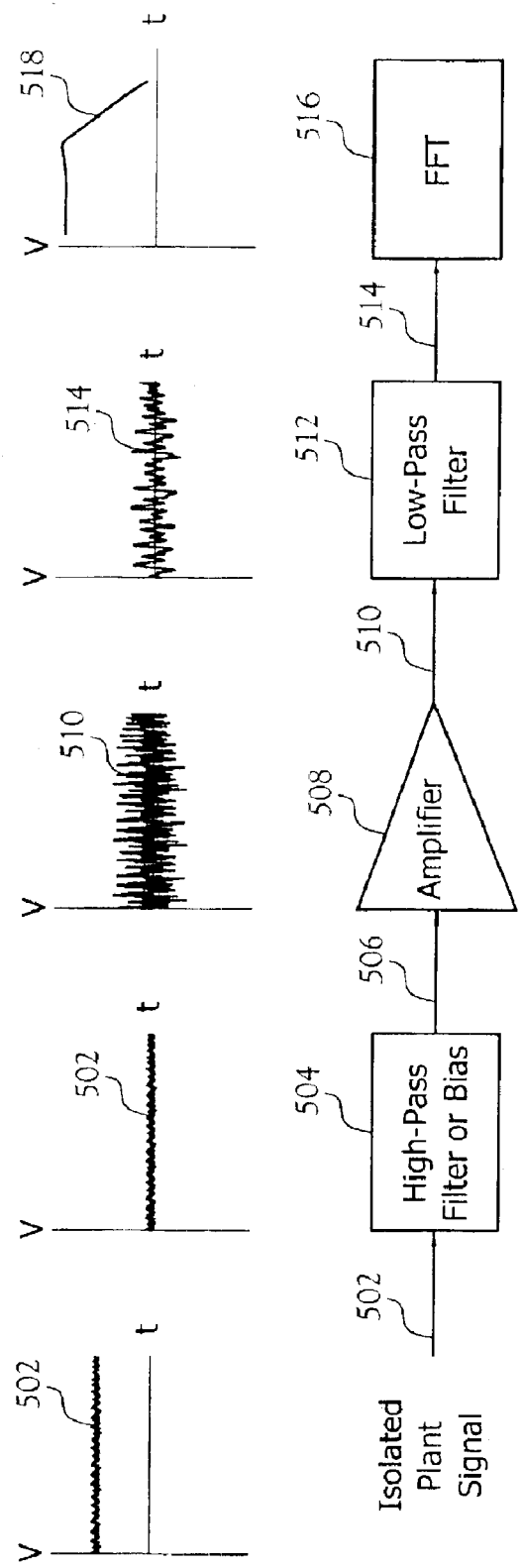

INTEGRATED SYSTEM FOR VERIFYING THE PERFORMANCE AND HEALTH OF INSTRUMENTS AND PROCESSES

CROSS-REFERENCE TO RELATED APPLICATIONS

This application claims priority to Provisional Application Ser. No. 60/380,516 filed on May 14, 2002.

BACKGROUND OF THE INVENTION

1. Field of Invention

This invention pertains to a system for verifying the performance of process instruments as well as the process itself. More particularly, this invention pertains to providing predictive maintenance and management of aging of plant instruments and processes.

2. Description of the Related Art

Process instruments measure process parameters such as temperature, pressure, level, flow, and flux. A process instrument typically consists of a sensor to measure a process parameter and associated equipment to convert the output of the sensor to a measurable signal such as a voltage or a current signal.

Accuracy and response time are two characteristics of process instruments. Accuracy is a measure of how well the value of a process parameter is measured and response time is a measure of how fast the instrument responds to a change in the process parameter being measured.

To verify the accuracy of a process instrument, it is typically calibrated. To verify the response time of a process instrument, it is typically response time tested. The calibration and response time testing can be performed in a laboratory, but it is desirable to perform the calibration and response time testing while the instrument is installed in the plant and as the plant is operating. When an instrument is tested while installed in a process, the work is referred to as in situ testing. If this can be done while the plant is operating, the work is referred to as on-line testing.

BRIEF SUMMARY OF THE INVENTION

According to one embodiment of the present invention, an integrated system for verifying the performance and health of instruments and processes is provided. The system combines on-line and in situ testing and calibration monitoring.

The system samples the output of existing instruments in operating processes in a manner that allows verification of both calibration (static behavior) and response time (dynamic behavior) of instruments as installed in operating processes, performs measurements of calibration and response time if on-line tests show significant degradation, and integration of these testing tools into a program of testing that includes the necessary technologies and equipment.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a block diagram of one embodiment of noise analysis monitoring showing waveforms at various points;

DETAILED DESCRIPTION OF THE INVENTION

Figure 1:
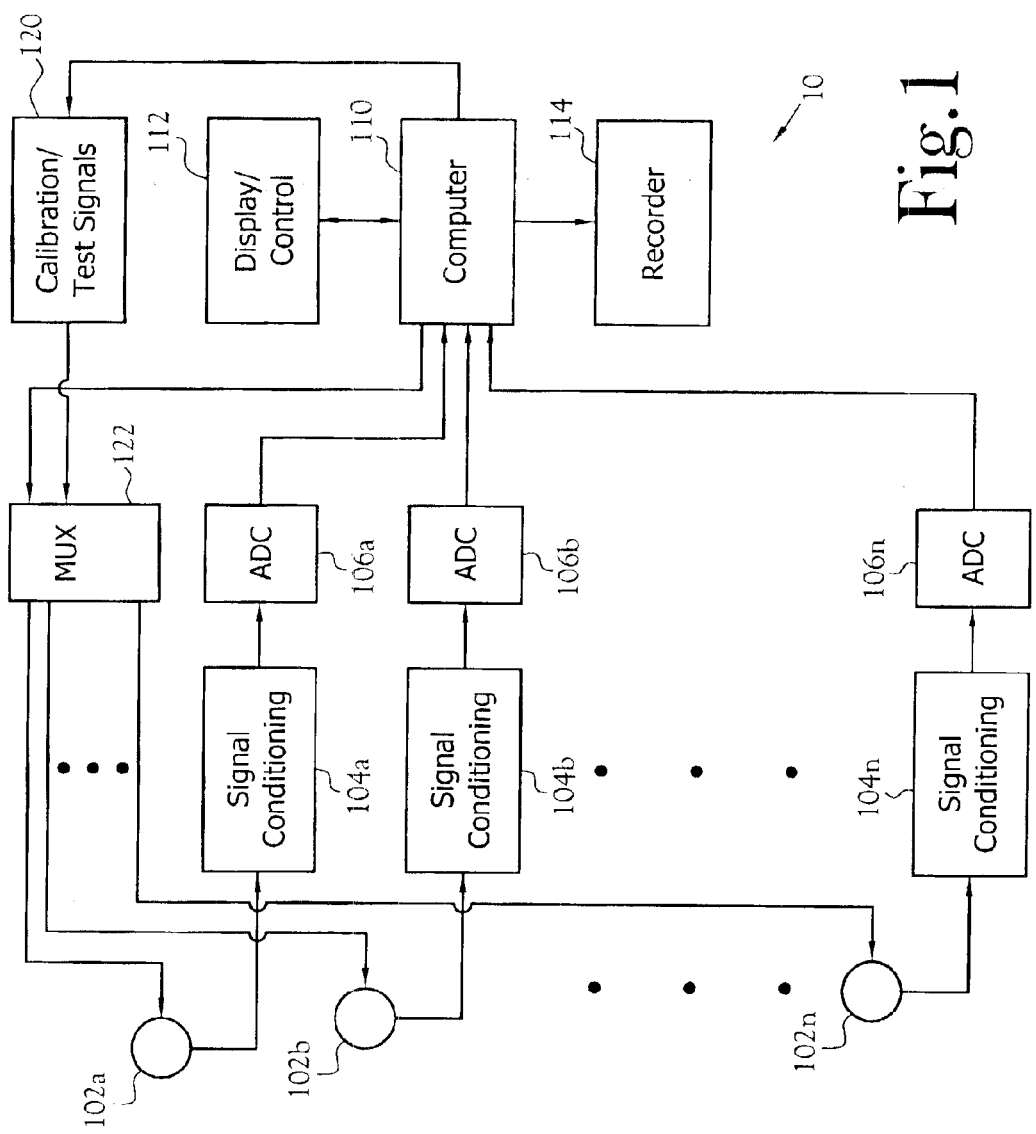
FIG. 1 is a block diagram of one embodiment of the integrated system.

An integrated system for monitoring the performance and health of instruments and processes and for providing predictive maintenance and management of aging of plant instruments and processes is disclosed. One embodiment of the system 10, as implemented with a computer 110, is illustrated in FIG. 1. The integrated system 10 detects instrument calibration drift, response time degradation, vibration signatures of the process and its components, cable condition data, existence and extent of blockages in pressure sensing lines and elsewhere in the system, fouling of venturi flow elements, and fluid flow rate, among other instrument and process conditions and problems.

The system 10 integrates an array of technologies into an apparatus and method consisting of software, routines, procedures, and hardware that are used in an industrial process (e.g., a nuclear power plant) to verify instrument calibration and response time, measure vibration of process components, identify process anomalies, and provide a means to determine when an instrument must be replaced or when the process needs corrective maintenance. Various embodiments of the invention include one or more of the following technologies: on-line monitoring of instrument calibration drift; noise analysis monitoring the response time of instruments, identifying blockages in pressure sensing lines, determining fluid flow rate, and detecting process problems by cross correlation of existing pairs of signals; loop current step response (LCSR) technique identifying a value for the response time of resistance temperature devices (RTDs) and thermocouples if it is determined by the noise analysis technique that the response time is degraded; time domain reflectometry and cable impedance measurements to identify problems in cables, connectors, splices, and the end device (these measurements include loop resistance, insulation resistance, inductance, and capacitance measurements and are collectively referred to as LCR measurements); cross calibration techniques to determine whether a group of temperature sensors have lost their calibration, provide new calibration tables for outliers, and identify the sensors that must be replaced; and empirical techniques to identify fouling of venturi flow elements.

FIG. 1 illustrates an embodiment of the integrated system 10. Numerous plant sensors 102a, 102b, . . . 102n each provide a signal to a signal conditioning module 104a, 104*b*, . . . 104*n*, to an analog-to-digital converter (ADC) 106*a*, 106*b*, . . . 106*n*, and into a computer 110. The computer 110 provides data to a recorder 114 and a display/controller 112. The display/controller 112 communicates with the computer 110 to confirm and initiate actions by the computer 110. The computer 110 also provides data to a multiplexer (MUX) 122 and a calibration/test signal module 120, which also is connected to the MUX 122. The MUX 122 provides a calibration or test signal to a sensor 102*a*, 102*b*, . . . 102*n*, as determined by the computer 110, for testing the loop or the sensor 102*a*, 102*b*, . . . 102*n*.

As illustrated, the integrated system 10 performs on-line monitoring and in situ testing of sensors 102*a*, 102*b*, . . . 102*n* installed in an industrial plant, for example, a power plant or a manufacturing plant. On-line monitoring involves recording and plotting the steady-state output of sensors, or instruments, during plant operation to identify the condition of the sensor and the process, including drift. For redundant instruments, drift is identified by comparing the readings of the redundant instruments to distinguish between process drift and instrument drift. For non-redundant instruments, process empirical modeling using neural networks or other techniques and physical modeling are used to estimate the process and use it as a reference for detecting instrument drift. Process modeling is also used with redundant instruments to provide added confidence in the results and account for common mode, or systemic, drift. This is important because some generic problems cause redundant instruments to all drift together in one direction.

The sensors 102*a*, 102*b*, . . . 102*n*, in one embodiment, include transmitters monitoring various processes. These transmitters include, but are not limited to, pressure transmitters, flow transmitters, temperature transmitters. In another embodiment, the sensors 102*a*, 102*b*, . . . 102*n* include instrument loops in which the signal is derived from an instrument monitoring a process variable. In still another embodiment, the sensors 102*a*, 102*b*, . . . 102*n* include smart sensors that provide a digital signal to the remainder of the loop. In this embodiment, the computer 110 of the integrated system 10 receives the digital signal directly from the sensors 102*a*, 102*b*, . . . 102*n* without having the signal pass through an ADC 106*a*, 106*b*, . . . 106*n*.

In one embodiment, the integrated system 10 is an adjunct to the normal plant instrumentation system. That is, the integrated system 10 works in conjunction with the normal, installed plant instrumentation to provide on-line calibration and testing capabilities in addition to the normal monitoring and control functions of the instruments. Toward that end, the connection to plant sensors 102*a*, 102*b*, . . . 102*n* are made by tapping into the loop signals. For example, with a standard 4–20 milliampere current loop, a resister is added to the loop and the voltage across the resistor is used as the input to the signal conditioning module 104*a*, 104*b*, . . . 104*n*. In a nuclear power plant, either the signal conditioning module 104*a*, 104*b*, . . . 104*n* or another module provides isolation between the safety related sensor and the integrated system 10.

In another embodiment of the integrated system 10, multiple plant sensors 102*a*, 102*b*, . . . 102*n* are connected to an input multiplexer that feeds an ADC that inputs a digital signal to the computer 110. The input multiplexer is an alternative to the plurality of ADCs 106*a*, 106*b*, . . . 106*n* illustrated in FIG. 1. In still another embodiment of the integrated system 10, the digital signals representing the sensor values are obtained from a plant computer, which is monitoring the plant sensors 102*a*, 102*b*, . . . 102*n* for other purposes, such as operation and control of the plant.

Figure 2:
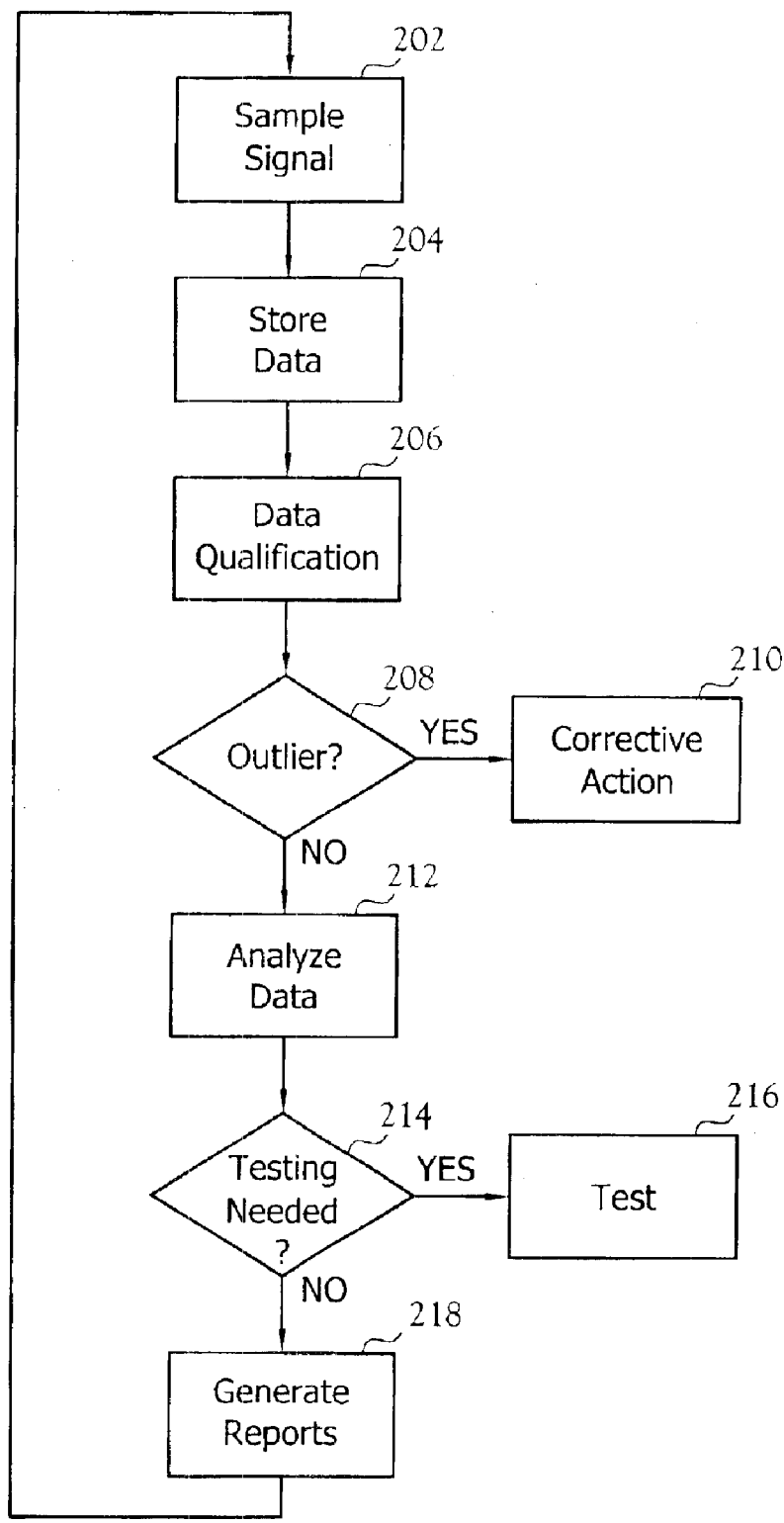
FIG. 2 is a flow diagram of the steps for processing the signals from one sensor.

FIG. 2 illustrates a flow diagram of the integrated system 10 for a single sensor 102*a*, 102*b*, . . . 102*n*. The signal from a sensor 102*a*, 102*b*, . . . 102*n* is sampled 202 and the sample data is stored 204. The sampled data is screened with data qualification 206 to determine whether the data indicates an outlier, or bad data, 208. If an outlier is indicated, corrective action 210 is determined to be necessary. If an outlier is not indicated, then the data is analyzed 212. The results of the analysis will indicate whether testing is needed 214. If testing is indicated, the appropriate test 216 is performed, otherwise, the data collection process is repeated by continuing to sample the signal 202. In one embodiment, the results of the analysis 212, after determining that testing is not needed 214, are generated 218 as plots, bar charts, tables, and/or reports, which are displayed for the operator and recorded for future reference. In another embodiment, the results of the analysis 212 are generated 218 before the testing determination 214. In still another embodiment, the results of the analysis 212 are generated 218 at periodic intervals.

Sampling the signal 202 includes sampling the signals from the output of instruments in a manner which would allow one to verify both the static calibration and dynamic response time of instruments and the transient behavior of the process itself. Sampling the signal 202 occurs at a sampling frequency that is between direct current (dc) up to several kilohertz. In one embodiment, a single sensor 102*a*, 102*b*, . . . 102*n* has two signal conditioning modules 104*a*, 104*b*, . . . 104*n* and two ADCs 106*a*, 106*b*, . . . 106*n* providing two digital signals to the computer 110. One ADC 106*a*, 106*b*, . . . 106*n* samples the dc component of the sensor signal, which provides the data for static calibration analysis, including drift. The other ADC 106*a*, 106*b*, . . . 106*n* samples at rates up to several thousand times per second, which provides the data for dynamic response analysis, including the noise analysis and process transient information. In another embodiment, a single ADC 106*a*, 106*b*, . . . 106*n* samples at rates up to several thousand times per second and the computer 110 stores two data streams, one for static calibration analysis and another for dynamic response analysis, vibration measurements and detection of other anomalies.

In one embodiment, storing the data 204 includes storing the sample data in random access memory (RAM) in the computer 110. In another embodiment, storing the data 204 includes storing the sample data in a permanent data storage device, such as a hard disk, a recordable compact disk (CD), or other data storage media.

In one embodiment, the data qualification 206 includes screening the data using data qualification algorithms to remove bad data. In another embodiment, the data qualification 206 includes screening the data to determine whether a sensor value is an outlier 208. If a sensor value is determined to be an outlier 208, corrective action 210 is taken. In one embodiment, the corrective action 210 includes alarming the condition, which alerts an operator so that corrective action can be taken. In another embodiment, corrective action 210 includes initiating in situ testing, such as response time testing, or calibration. For example, if the sensor 102*a*, 102*b*, . . . 102*n* is an RTD, the corrective action 210 includes one or more of the following in situ tests: LCSR, TDR, cable impedance measurements, and cross calibration. Cross calibration is performed at several temperatures to verify the calibration of RTDs over a wide temperature range and to help produce a new resistance versus temperature table for an outlier. In one embodiment, one or more of the in situ tests are performed by the integrated system 10. In one embodiment, the tests are performed automatically based on rules established by the programming. In another embodiment, the tests are performed after the condition is alarmed to the operator and the operator approves the test to be run.

The data qualification 206, in one embodiment, scans and screens each data record to remove any extraneous effects, for example, artifacts such as noise due to interference, noise due to process fluctuations, signal discontinuities due to maintenance activities and plant trips, instrument malfunctions, nonlinearities, and other problems.

If the sensor data is not an outlier, the data is analyzed 212 and analysis results are produced. The data analysis 212 performed is dependent upon the data that is sampled and how it is sampled. Data analysis 212 involves using available data to estimate and track the process variable/value being measured. The process value estimate is then used to identify the deviation of each instrument channel from the process value estimate. A variety of averaging and modeling techniques are available for analysis of on-line monitoring data for instrument calibration verification. More reliable results are achieved when three or more of these techniques are used together to analyze the data and the results are averaged. The uncertainties of each technique must be evaluated, quantified, and properly incorporated in the acceptance criteria. The data analysis 212 includes, but is not limited to, static analysis, dynamic response analysis, and transient process analysis. Static analysis includes the process analysis illustrated in FIG. 3 and the drift analysis illustrated in FIG. 8. Dynamic response analysis includes the noise analysis illustrated in FIGS. 4 to 7.

The analysis results are used to determine whether testing is needed 214. If so determined, appropriate tests 216 are performed. In one embodiment, these tests 216 are the same as identified above with respect to the corrective action 210. If testing 216 is not required, the process repeats by taking another sample 202.

In one embodiment, each of the functions identified in FIG. 2 are performed by one or more software routines run by the computer 110. In another embodiment, one or more of the functions identified in FIG. 2 are performed by hardware and the remainder of the functions are performed by one or more software routines run by the computer 110. In still another embodiment, the functions are implemented with hardware, with the computer 110 providing routing and control of the entire integrated system 10.

The computer 110 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function.

Figure 3:
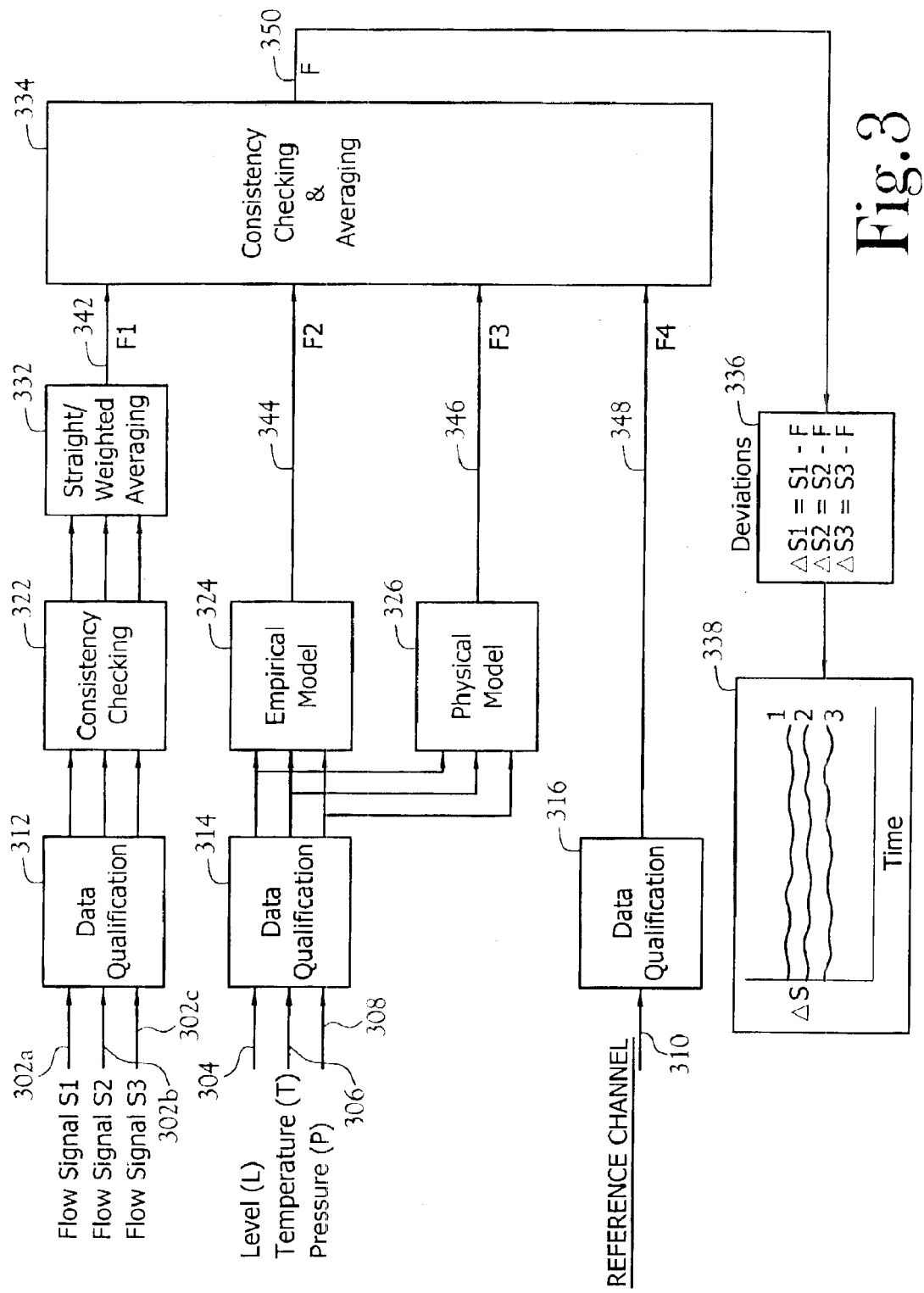
FIG. 3 is an block diagram of one embodiment of on-line monitoring of redundant flow signals.

FIG. 3 illustrates one embodiment of on-line monitoring of redundant flow signals. Those skilled in the art will recognize that the input sensors can be of other plant variables, such as pressure, temperature, level, radiation flux, among others, without departing from the spirit and scope of the present invention. The illustrated on-line monitoring system uses techniques including averaging of redundant signals 302a, 302b, 302c (straight and/or weighted averaging 332), empirical modeling 324, physical modeling 326, and a calibrated reference sensor 310. The raw data 302a, 302b, 302c, 304, 306, 308, 310 is first screened by a data qualification algorithm 312, 314, 316 and then analyzed 322, 324, 326, 332, 334 to provide an estimate 350 of the process parameter being monitored. In the case of the averaging analysis, the data is first checked for consistency 322 of the signals. The consistency algorithm 322 looks for reasonable agreement between redundant signals. The signals that fall too far away from the other redundant signals 302a, 302b, 302c are excluded from the average or weighted average 342. In other embodiments, one or more of the reference methods are used with the exclusion of the others. For example, in one embodiment, if an empirical model 324 has not been developed for the process variable being measured, but a physical model 326 has been developed, the process value 342 developed through straight or weighted averaging 332 and the process value 346 determined by the physical model 332 are used.

The diverse signals, which in the illustrated embodiment include level (L) 304, temperature (T) 306, and pressure (P) 308, are process measurements that bear some relationship to the process flow 302a, 302b, 302c, which is the measured variable. The diverse signals 304, 306, 308 are used in an empirical model 324 to calculate the process flow 344 based on those variables 304, 306, 308. The diverse signals 304, 306, 308 are also used in a physical model 326 to calculate the process flow based on those variables 304, 306, 308. The flow value (F2) 344 derived from the empirical model 324 and the flow value (F3) 346 derived from the physical model 326, along with the straight or weighted average flow (F1) 342 and the reference flow (F4) 348, are checked for consistency and averaged 334 to produced a best estimate of the process flow (F) 350, which is used to calculate deviations 336 of the flow signals 302a, 302b, 302c from the best estimate (F) 350. The deviations 336, provide an output of the signals' 302a, 302b, 302c performance, which, in one embodiment, is represented by a graph 338. In another embodiment, the output is used to determine whether testing 214 is required.

The reference channel 310 is one channel of the group of redundant sensors in which the process signals, such as the flow signals 302a, 302b, 302c, are a part. Upon evaluating historical data, biases may inherently be in the data as compared to the reference values. These biases can be due to normal calibration differences between instruments, different tap locations, etc. To build confidence in and reconfirm the reference for these comparisons, one of the redundant channels 310 should be manually calibrated on a rotational basis so that all redundant channels 302a, 302b, 302c, 310 are manually calibrated periodically. If redundant channels 302a, 302b, 302c are not available, then an accurate estimate of the process parameter from analytical techniques 324, 326 are used to track the process and distinguish instrument drift from process drift.

A process parameter cannot usually be simply identified from measurement of another single parameter. For example, in physical modeling 326, complex relationships are often involved to relate one parameter to others. Furthermore, a fundamental knowledge of the process and material properties are often needed to provide reasonable estimates of a parameter using a physical model 326. Typically, empirical models 324 use multiple inputs 304, 306, 308 to produce a single output 344 or multiple outputs. In doing this, empirical equations, neural networks, pattern recognition, and sometimes a combination of these, and other, techniques, including fuzzy logic, for data clustering are used.

The on-line monitoring illustrated in FIG. 3 identifies calibration problems at the monitored point, that is, under the normal process operating conditions. During normal operations, the monitored point is relatively constant, accordingly, the illustrated embodiment is a one-point calibration check during steady state conditions. When the process is started up or shut down, the process variables change and the on-line monitoring verifies the calibration over the range that the variable changes under the varying process conditions. When data is taken for a wide operating range, extrapolation is used to verify instrument performance above and below the operating range.

The data qualification 312, 314, 316, the consistency checking 322, the empirical model 324, the physical model 326, the straight or weighted averaging 332, the consistency checking and averaging 334, and the deviations 336, in one embodiment, are implemented with software routines running on at least one computer 110. In another embodiment, the functions are implemented with a combination of hardware and software.

Figure 4:
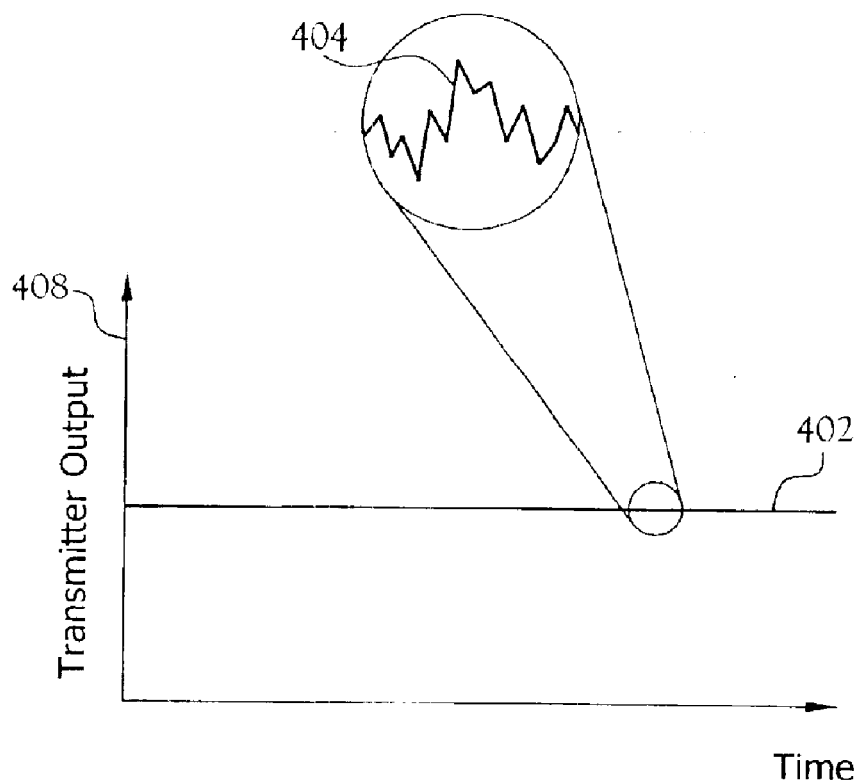
FIG. 4 is diagram showing a noise component of a sensor signal.

FIGS. 4 through 7 illustrate noise analysis. FIG. 4 shows a waveform of a sensor signal 402 plotted as the sensor output 408 versus time 410. Over a long period with the process held stable, the sensor signal 402 appears as a dc signal, which has a relatively constant signal level, commonly called steady state value or the dc value. However, if a portion of the signal 402 is examined for a short period with a fast sampling rate, a varying signal 404 is seen. That is, there are natural fluctuations that normally exist on the output of sensors while the process is operating.

The varying signal 404 is the noise or alternating current (ac) component of the signal and originates from at least two phenomena. First, the process variable being measured has inherent fluctuations due to turbulence, random heat transfer, vibration, and other effects. Secondly, there are almost always electrical and other interferences on the signal. Fortunately, the two phenomenon are often at widely different frequencies and can thus be separated by filtering. The two types of noise must be separated because the fluctuations that originate from the process are used in performing the noise analysis, which is used for sensor and process diagnostics, response time testing of the sensor, vibration measurement of plant components, among other uses.

FIG. 5 illustrates one embodiment of noise analysis monitoring showing waveforms at various points along the process. A sensor signal 502 has a wave dc component and a noise component. A high-pass filter or bias 504 removes the dc component, leaving only the noise component 506. The noise component 506 is amplified 508 to produced an amplified signal 510, which is passed through a low-pass filter 512 to produce a process noise signal 514, which does not contain electrical noise. There are various methods available for the analysis of the process noise signal 514. One option is referred to as the frequency domain analysis, which can be implemented with a Fast Fourier Transform (FFT), and another is called the time domain analysis. The illustrated embodiment analyses the process noise signal 514 with an FFT 516 to produce a power spectral density (PSD) plot 518. In another embodiment, the process noise signal 514 is analyzed in the time domain, with autoregressive (AR) modeling being one example. An AR model is a time series equation to which the noise data 514 is fit and the model parameters are calculated. These parameters are then used to calculate the response time of a sensor or provide other dynamic analysis.

Figure 6:
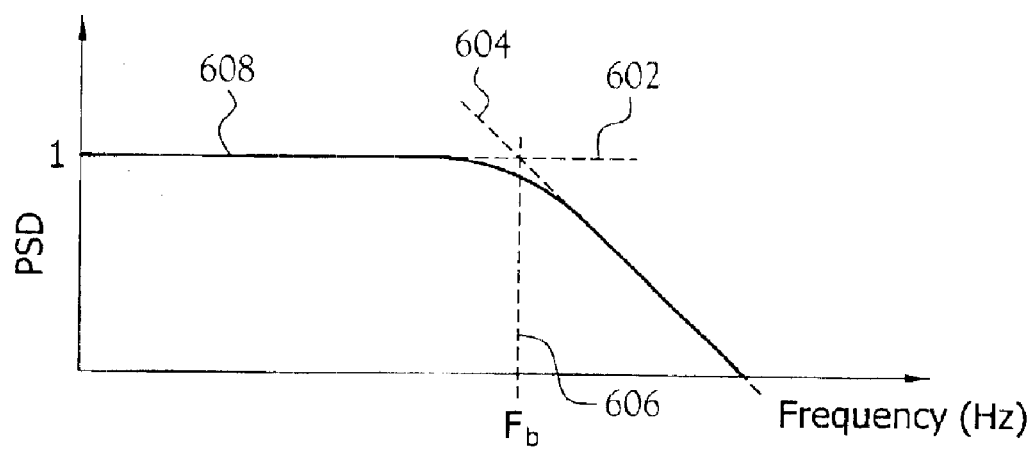
FIG. 6 is an ideal power spectrum density (PSD) graph.

FIG. 6 illustrates an ideal PSD, which is a variance of a signal in a small frequency band as a function of frequency plotted versus frequency. For a simple first order system, the PSD is all that is needed to provide a sensor response time, which is determined by inverting the break frequency (Fb) 606 of the PSD. The break frequency 606 is the intersection of a line 602, which forms the flat portion of the curve 608, with a line 604, which follows the slope of the trailing portion. The ideal PSD of FIG. 6 does not show any resonances or other process effects that may affect the response time determination or other sensor or process diagnostics.

Figure 7:
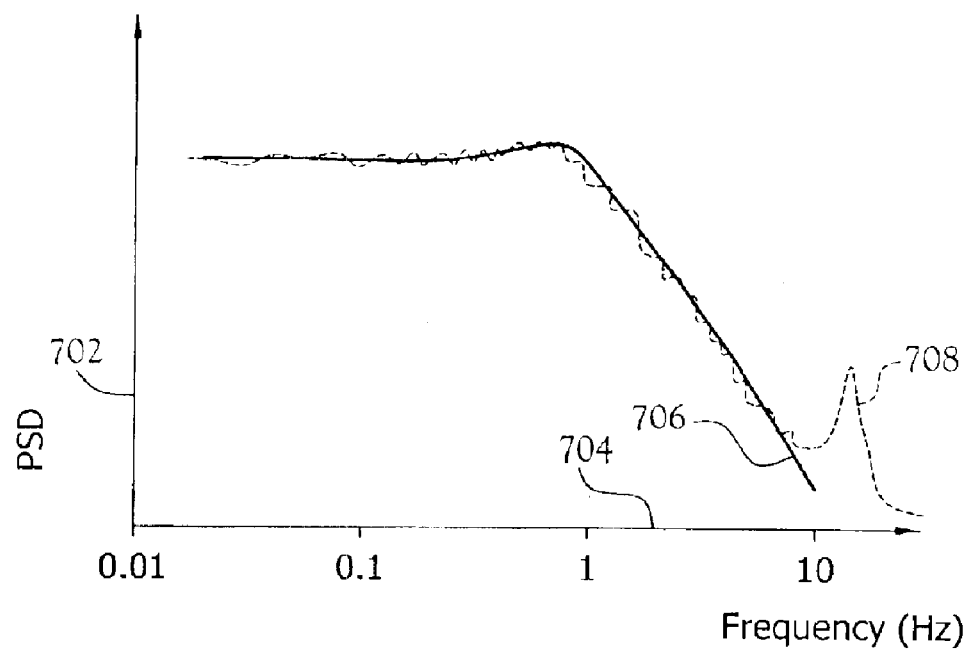
FIG. 7 is a representative power spectrum density (PSD) graph.

FIG. 7 illustrates a representative PSD which shows a resonance and illustrates how an actual PSD might deviate from the ideal curve 608. A PSD 708 is determined for a sensor and the PSD amplitude 702 is plotted versus frequency 704. The solid line 706 is a smoothed trace of the calculated PSD 708, which contains artifacts that deviate from the ideal.

Impulse lines are the small tubes which bring the process signal from the process to the sensor for pressure, level, and flow sensors. Typically, the length of the impulse lines are 30 to 300 meters, depending on the service in the plant, and there are often isolation valves, root valves, snubbers, or other components on a typical impulse line. The malfunction in any valve or other component of the impulse line can cause partial or total blockage of the line. In addition, impulse lines can become clogged, or fouled, due to sludge and deposits that often exist in the process system. The clogging of sensing lines can cause a delay in sensing a change in the process pressure, level, or flow. In some plants, sensing line clogging due to sludge or valve problems has caused the response time of pressure sensing systems to increase from 0.1 seconds to 5 seconds. Clogged sensing lines can be identified while the plant is on-line using the noise analysis technique. Basically, if the response time of the pressure, level, or flow transmitter is measured with the noise analysis technique (as illustrated in FIG. 7) and compared to a baseline value, the difference includes any delay due to the sensing line length and any blockages, voids, and other restrictions.

Figure 8:
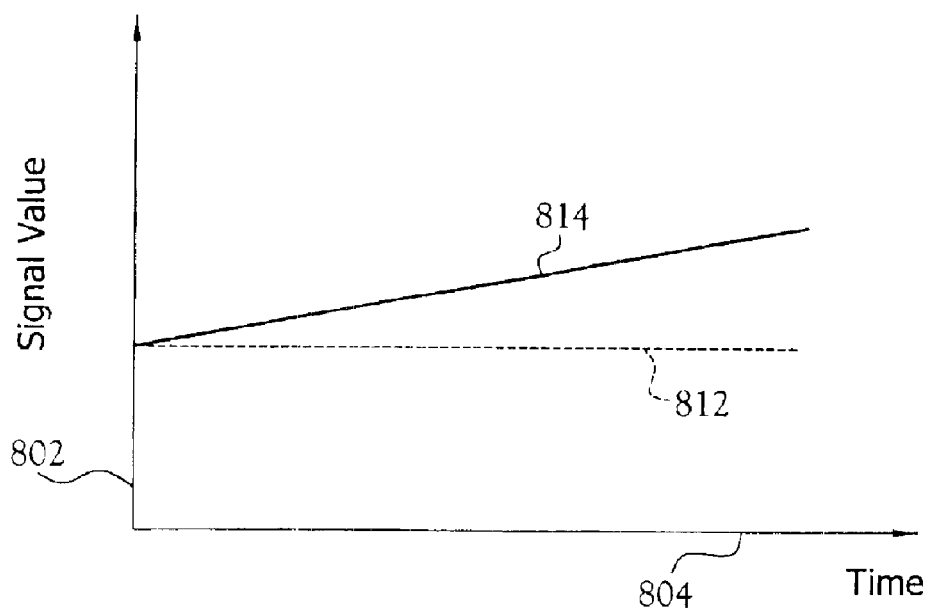
FIG. 8 is graph of a sensor experiencing drift over a period of time.

FIG. 8 illustrates sensor drift by plotting the amplitude 802 of a drifting sensor signal 814 versus time 804. FIG. 8 also illustrates a non-drifting sensor signal 812 over the same period. Sensor drift is the change in the steady state value over time of the sensor for a constant process value. Typically, sensor drift is detected by trending sensor values over a period and comparing the measured values to a known or estimated value.

Sensor, or instrument, drift is characterized as either zero shift or span shift, or a combination of the two. Zero shift drift occurs when a sensor output is shifted by an equal amount over the sensor's entire range. Span shift drift occurs when a sensor output is shifted by an amount that varies over the sensor's range. Process drift occurs when the process being measured drifts over time.

To separate sensor drift from process drift or to establish a reference for detecting drift, a number of techniques are used depending on the process and the number of instruments that can be monitored simultaneously. For example, if redundant instruments are used to measure the same process parameter, then the average reading of the redundant instruments is used as a reference for detecting any drift. In this case, the normal output of the redundant instruments are sampled and stored while the plant is operating. The data are then averaged for each instant of time. This average value is then subtracted from the corresponding reading of each of the redundant instruments to identify the deviation of the instruments from the average. In doing so, the average reading of the redundant instruments is assumed to closely represent the process. To rule out any systematic (common) drift, one of the redundant transmitters is calibrated to provide assurance that there have been no calibration changes in the transmitter. Systematic drift is said to occur if all redundant transmitters drift together in one direction. In this case, the deviation from average would not reveal the systematic drift.

Another approach for detecting systematic drift is to obtain an independent estimate of the monitored process and track the estimate along with the indication of the redundant instruments. This approach is illustrated in FIG. 3, which is an embodiment using redundant flow signals, although other process variables are monitored in other embodiments. A number of techniques may be used to estimate the process. These may be grouped into empirical and physical modeling techniques. Each technique provides the value of a process parameter based on measurement of other process parameters that have a relationship with the monitored parameter. For example, in a boiling process, temperature and pressure are related by a simple model. Thus, if temperature in this process is measured, the corresponding pressure can be determined, tracked, and compared with the measured pressure as a reference to identify systematic drift. This approach can also be used to provide a reference for detecting drift if there is no redundancy or if there is a need to add to the redundancy. With this approach, the calibration drift of even a single instrument can be tracked and verified on-line.

Figure 9:
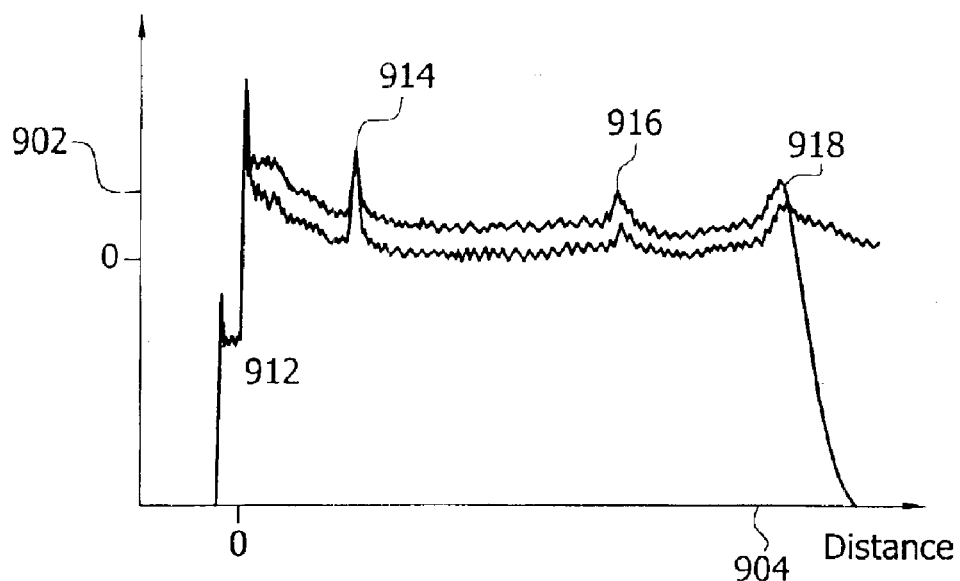
FIG. 9 is a graph of a time-domain-reflectometry (TDR) trace for a sensor and its cable.

FIG. 9 illustrates a graph of a time-domain-reflectometry (TDR) trace for a sensor and its cable. The TDR trace is plotted as a reflection coefficient 902 versus distance 904 from the test point 912. The TDR trace shows peaks for cable discontinuities for a remote shutdown panel 914, a wall penetration 916, and the instrument 918, which can be an RTD or other sensor or instrument. The TDR trace is used as a troubleshooting tool to identify, locate, or describe problems, and establish baseline measurements for predictive maintenance and ageing management. There are electrical tests, mechanical tests, and chemical tests that are used to monitor or determine the condition of cables. The electrical tests, such as the TDR, have the advantage of providing the capability to perform the tests in situ, often with no disturbance to the plant operation.

For example, RTD circuits that have shown erratic behavior have been successfully tested by the TDR method to give the maintenance crew proper directions as to the location of the problem. The TDR technique is also helpful in troubleshooting motor and transformer windings, pressurizer heater coils, nuclear instrumentation cables, thermocouples, motor operated valve cables, etc. To determine the condition of cable insulation or jacket material, in addition to TDR, electrical parameters such as insulation resistance, dc resistance, ac impedance, and series capacitance are measured.

Figure 10:
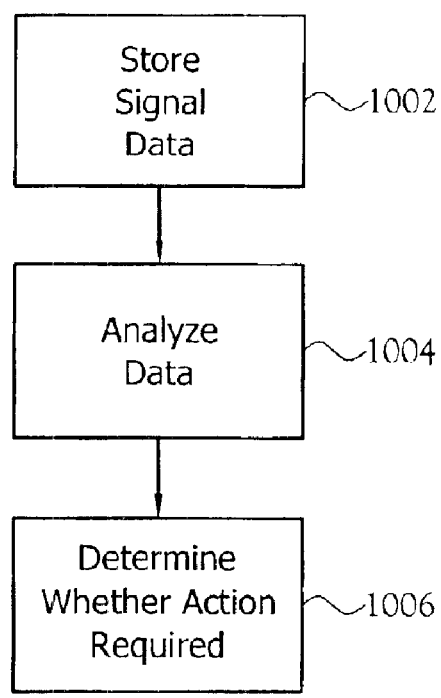
FIG. 10 is a flow diagram of one embodiment for analyzing the data.

FIG. 10 is a flow diagram of one embodiment of functions performed by the integrated system 10. The signal data is stored 1002 as a first step. After storing signal data 1002, the data is analyzed 1004. The results of the analysis 1004 are used to determine whether action is required 1006 to further test or correct a found condition. In one embodiment, storing the signal data 1002 is performed by the computer 110 through a routine.

The data analysis 1004, in one embodiment, is performed by the computer 110 through one or more routines. For example, the on-line monitoring illustrated in FIG. 3 is performed by software run by the computer 110. Also, the noise analysis and drift analysis are performed by software run by the computer 110. One or more of these analysis techniques can be used for each sensor. The data analysis 1004 performed provides information on the performance and health of the monitored instruments and processes.

The results of the data analysis 1004 are used to determine whether action is required 1006. The actions required 1006, in one embodiment, are performed by the computer 110 through one or more routines. The actions required 1006 include one or more of the LCSR, TDR, cable impedance measurements, and cross calibration. Additionally, the actions required 1006, in other embodiments, include alarming an out of tolerance condition and awaiting a response by an operator to continue corrective action. In one embodiment, the corrective action is performed by the integrated system 10. In another embodiment, the corrective action is performed by another system after being identified by the integrated system 10.

Figure 11:
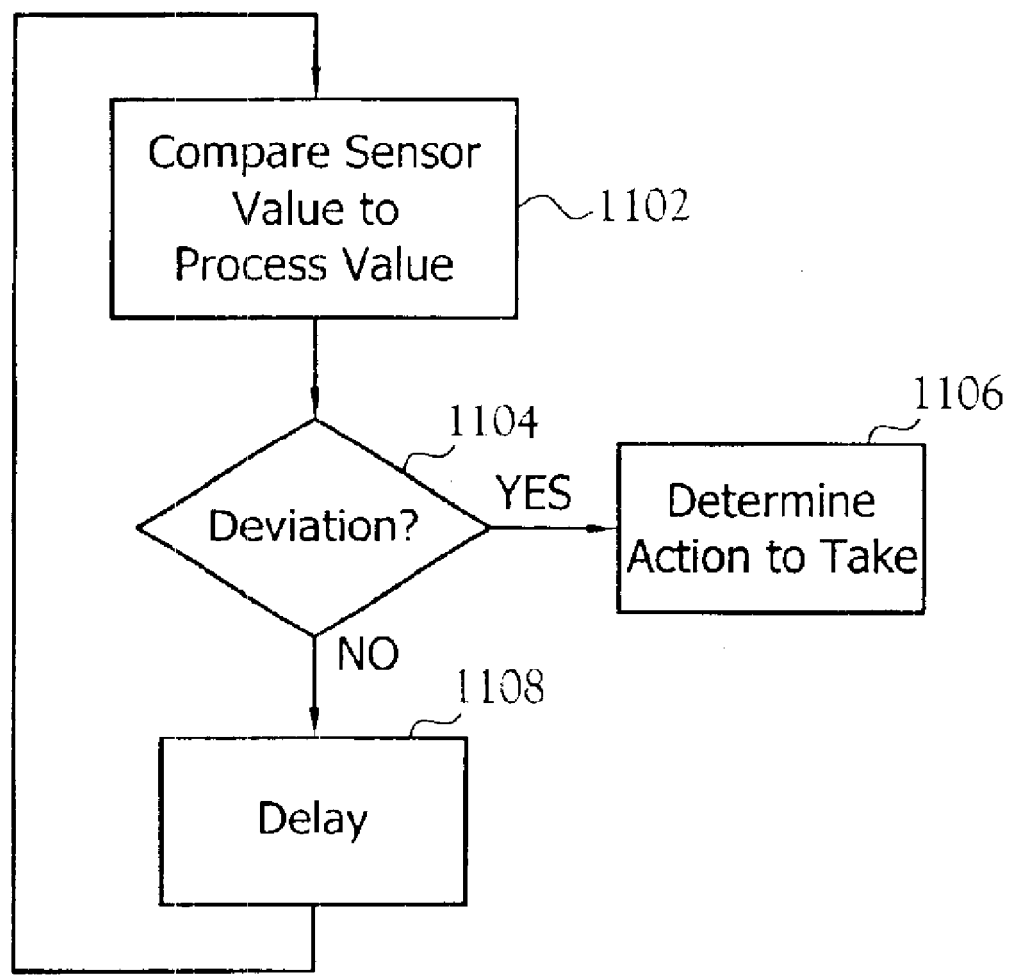
FIG. 11 is a flow diagram for one embodiment of comparing the sensor value to a process value.

FIG. 11 illustrates one embodiment of the data analysis 1004 and determination of whether action is required 1006. A sensor value is compared to a process value 1102 to determine whether there is a deviation 1104 which would require determining an action to take 1106 if the deviation 1104 is actionable. If there is not a deviation 1104, there is, in the illustrated embodiment, a delay 1108 in processing before making the next comparison 1102, thereby completing the loop. In another embodiment, the next comparison 1102 is performed after the deviation determination 1104 without waiting for a defined delay 1108. The process value used for the comparison can be based on an empirical model, on a physical model, on an average of redundant sensor values, or on other techniques or a combination of techniques for determining the process value at the time of the comparison to the measured sensor value.

Figure 12:
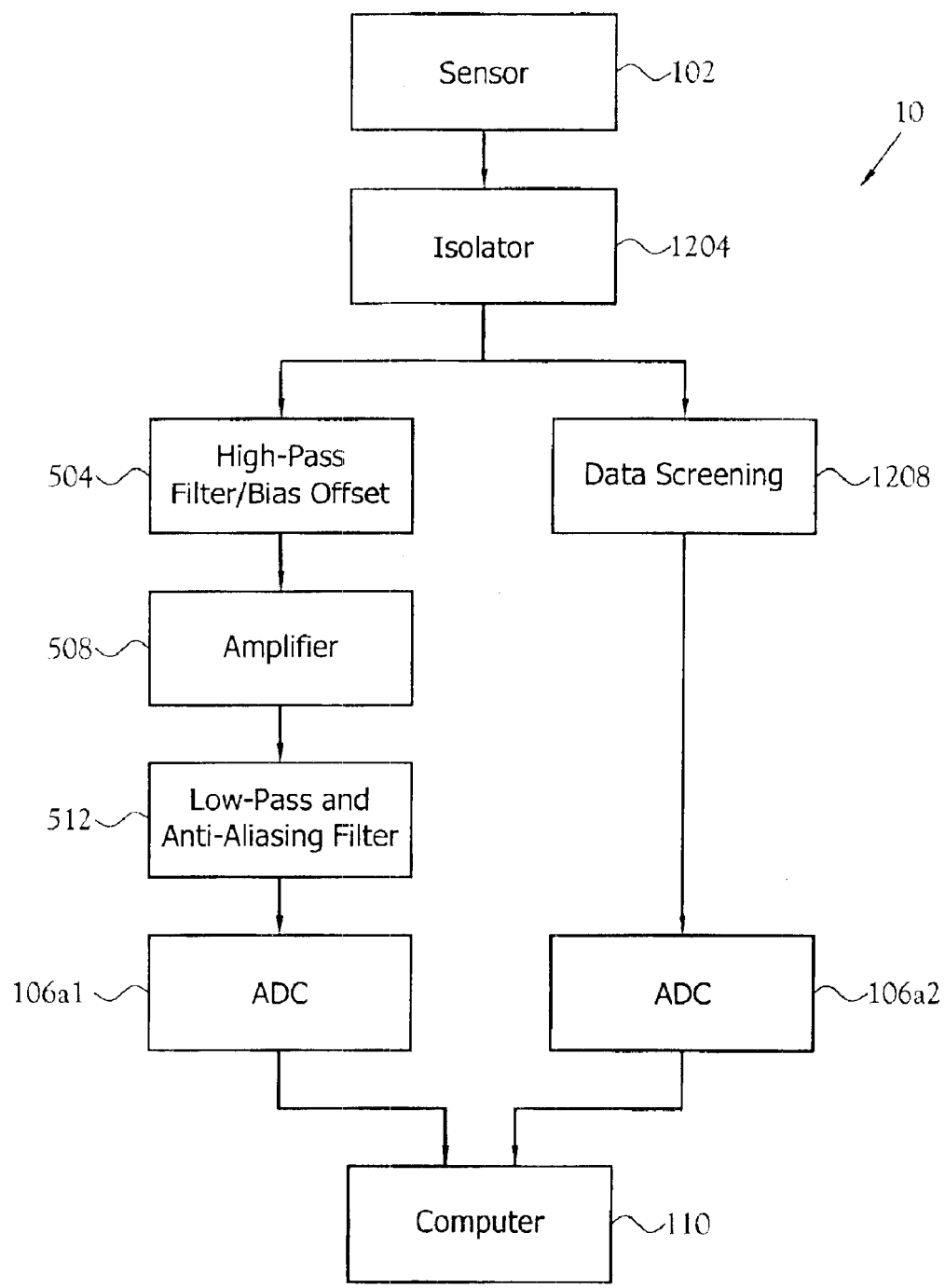
FIG. 12 is a block diagram of an embodiment of one sensor loop.

FIG. 12 illustrates a block diagram of an embodiment of one sensor loop showing a sensor 102 feeding an isolator 1204, which isolates the instrument loop from the integrated system 10 such that the integrated system 10 does not affect the normal operation of the sensor loop. In one embodiment, the isolator 1204 is a resister in the current loop of which the sensor 102 is a part. The voltage across the resistor is the signal provided to the high-pass filter/bias offset module 504 and the data screening module 1208. In another embodiment, the isolator 1204 is a safety related isolation module such as used in a nuclear power plant to isolate safety related components and circuits.

The isolator 1204 provides a signal to a high-pass filter or bias offset 504, an amplifier 508 and a low-pass and anti-aliasing filter 512, which outputs a signal to an ADC 106a1. This ADC 106a1 provides a digital signal suitable for noise analysis. In one embodiment, the low-pass filter 512 provides filtering to remove the electrical noise on the signal from the sensor 102. In another embodiment, the low-pass filter 512 provides anti-aliasing filtering, which reduces the high frequency content of the signal to better enable digital sampling by the ADC 106a1.

The isolator 1204 also provides a signal to a data screening module 1208, which outputs a signal to an ADC 106a2. This ADC 106a2 provides a digital signal suitable for process monitoring and drift analysis. The two ADCs 106a1, 106a2 supply digital signals to the computer 110.

In another embodiment, the signals from the sensor 102 are obtained via a data acquisition circuit. In still another embodiment, the sensor 102 or the isolator 1204 provides a digital output, in which case the ADCs 106a1 to 106a2 are not necessary and the data screening 1208, the filtering 504, 512, and amplification 508 are performed within the computer 110.

The embodiment illustrated in FIG. 12 uses a combination of hardware and software to form the integrated system 10. In one embodiment, each sensor 102a through 102n has at least one ADC 106a to 106n. If the loop requires it, a data screening module 1208 is used to feed the ADC 106a to 106n. Also, if the loop is such that a noise analysis is to be performed, the high-pass filter or bias offset 504, the amplifier 508 and the low-pass and anti-aliasing filter 512 are used and outputs a signal to another ADC 106a1 to 106n1. The computer 110 performs the processing illustrated in FIG. 2. In one embodiment, the corrective action 210 and test 216 functions illustrated in FIG. 2 are performed under computer 110 control through additional circuits communicating with the computer 110 and connected to the sensor 102.

The integrated system 10 is implemented with at least one computer 110. Although not meant to be limiting, the above-described functionality, in one embodiment, is implemented as standalone native code. Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM drive) or a floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required steps.

From the foregoing description, it will be recognized by those skilled in the art that an integrated system 10 for verifying the performance and health of instruments and processes has been provided. The system 10 monitors plant sensors, analyzes the condition of the sensors and the processes being monitored, and takes corrective action as determined by the analysis results. The corrective action includes testing performed in situ, alarming out of tolerance conditions to an operator, initiating work orders for investigation by maintenance workers, or any other task suitable for the condition of the sensor or process.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An integrated system for verifying the performance and health of a plurality of instruments and processes, said system comprising:

a plurality of digital signals, each representing an output from a sensor;

an output device, said output device selectively sending one of a calibration and a test signal to a selected one of said sensors; and a computer responsive to said plurality of digital signals, said computer communicating with said output device, said computer having software programmed to perform the functions of storing a plurality of sampled data in a storage media;

screening said plurality of sampled data to remove outliers;

analyzing said sampled data and producing analysis results, said function of analyzing including performing a static analysis and performing a dynamic response analysis;

determining whether a corrective action is required by said analysis results, if corrective action is required, initiating said corrective action by communicating with said output device; and generating output of said analysis results.

2. The integrated system of claim 1 wherein said static analysis includes performing a drift analysis.

3. The integrated system of claim 1 wherein said dynamic response analysis includes performing a noise analysis of changes of a process parameter due to process fluctuations.

4. The integrated system of claim 1 wherein said static analysis includes comparing a measured process value to a calculated process value.

5. The integrated system of claim 1 wherein said corrective action is at least one of a loop current step response test and a cross calibration.

6. The integrated system of claim 1 wherein said function of generating output includes producing at least one of a plot, a bar chart, a table, and a report.

7. At least one computer programmed to execute a process for verifying the performance and health of a plurality of instruments and processes, the process comprising:

storing a plurality of sampled data in storage media;

screening said plurality of sampled data to remove bad data;

analyzing said sampled data and producing analysis result, said step of analyzing including performing a static analysis and performing a dynamic response analysis;

determining whether a corrective action is required by said analysis results, said corrective action including at least one of an instrument calibration and an in situ test;

performing said corrective action if determined to be required; and generating output of said analysis results.

8. The process of claim 7 wherein said static analysis step of analyzing includes performing a drift analysis.

9. The process of claim 7 wherein said dynamic response analysis includes performing a noise analysis.

10. The process of claim 7 wherein said static analysis includes comparing a measured process value to a calculated process value.

11. The process of claim 7 wherein said step of performing the corrective action includes performing at least one of a loop current step response test and a cross calibration.

12. The integrated system of claim 7 wherein said step of generating output includes producing at least one of a plot, a bar chart, a table, and a report.

13. A method for verifying the performance and health of a plurality of instruments and processes, said method comprising:

sampling data from a plurality of sensors;

storing said sampled data;

screening said sampled data;

analyzing said sampled data, said step of analyzing including performing a static analysis and performing a dynamic response analysis;

performing a corrective action as determined during said step of analyzing; and generating results of said analysis and said testing.

14. The method of claim 13 wherein said static analysis includes performing a drift analysis.

15. The method of claim 13 wherein said dynamic response analysis includes performing a noise analysis.

16. The method of claim 13 wherein said static analysis includes comparing a measured process value to a calculated process value.

17. The method of claim 13 wherein said step of performing the corrective action includes performing at least one of a loop current step response test and a cross calibration.

18. An integrated system for ensuring the performance and health of a plurality of instruments and processes, said system comprising:
   a plurality of sensor signals each representing an output from a sensor;
   an output device, said output device selectively sending one of a calibration and a test signal to a selected one of said sensors; and
   a computer responsive to said plurality of sensor signals, said computer communicating with said output device, said computer programmed to execute a process comprising:
      storing a plurality of sampled data in a storage media, said plurality of sampled data corresponding to said plurality of sensor signals;
      analyzing said sampled data and producing analysis results, said step of analyzing including performing a static analysis and performing a dynamic response analysis; and
      determining whether a corrective action is required by said analysis results, if said corrective action is determined to be testing of one of said sensors, said processor executes the steps of
         communicating with said output device to perform a test on said one of said sensors,
         monitoring a set of data from said one of said sensors,
         calibrating said one of said sensors based on said set of data if said one of said sensors is able to be calibrated, and
         generating an alarm if an uncorrectable problem is detected.

19. The integrated system of claim 18 wherein said static analysis includes, under steady state conditions:
   for a process value with at least one redundant value, averaging a plurality of redundant channel process values to determine a measured process value, for said process value without said at least one redundant value, said measured process value being equal to said process value,
   determining a model process value from at least one of an empirical model and a physical model,
   averaging said measured process value and said at least one model process value to produce an estimated process value, if a reference channel process value is available, including said reference channel process value in averaging to produce said estimated process value, and
   determining a deviation for said process value from said estimated process value.

20. The integrated system of claim 19 further including performing a consistency check before said step of averaging to produce said estimated process value.

21. The integrated system of claim 19 further including, for said process value with said at least one redundant value, performing a consistency check of said process value and said at least one redundant value.

22. The integrated system of claim 19 wherein, for said process value with said at least one redundant value, said step of averaging said plurality of redundant channel process values includes applying a weight to each of said plurality of redundant channel process values.

23. The integrated system of claim 18 wherein said static analysis includes, under steady state conditions, determining a sensor drift value for at least one of sensor.

24. The integrated system of claim 18 wherein said dynamic response analysis determines a response time for at least one of said sensor.

25. The integrated system of claim 18 wherein said dynamic response analysis includes performing one of a frequency domain analysis and a time domain analysis of said plurality of sampled data.

26. The integrated system of claim 25 wherein said plurality of sampled data corresponds to a process parameter measured for a specified time that has passed through a high-pass filter, been amplified, and passed through a low-pass filter.

27. The integrated system of claim 25 wherein said frequency domain analysis includes a Fast Fourier Transform of said plurality of sampled data.

28. The integrated system of claim 18 further including a plurality of noise filters, wherein each one of said plurality of sensor signals passing through a corresponding one of said plurality of noise filters.

29. The integrated system of claim 18 further including a plurality of screening modules, wherein each one of said plurality of sensor signals passing through a corresponding one of said plurality of screening modules.

30. An integrated system for verifying the performance and health of a plurality of instruments and processes, said system comprising:
   a plurality of sensor signals each representing an output from a sensor; and
   a computer responsive to said plurality of sensor signals, said computer communicating with said output device, said computer programmed to execute a process for verifying instrument and process health comprising:
      storing a plurality of sampled data in a storage media, said plurality of sampled data corresponding to said plurality of sensor signals;
      analyzing said sampled data and producing analysis results, said step of analyzing including performing a static analysis and performing a dynamic response analysis; and
      determining whether a corrective action is required by said analysis results.

31. The integrated system of claim 30 wherein if said corrective action is determined to be testing of one of said sensors, said processor executes the steps of
   communicating with an output device to perform an in-situ test on said one of said sensors, said output device in communication with at least one of said sensors, and
   monitoring a set of data from said one of said sensors.

32. The integrated system of claim 31 further including the steps of
   calibrating said one of said sensors based on said set of date if said one of said sensors is able to be calibrated, and
   generating an alarm if an uncorrectable problem is detected.

* * * * *